US011588698B2

(12) United States Patent
Shivashankara et al.

(10) Patent No.: US 11,588,698 B2
(45) Date of Patent: Feb. 21, 2023

(54) POD MIGRATION ACROSS NODES OF A CLUSTER (71) Applicant: Hewlett Packard Enterprise Development LP, Houston, TX (US)

(72) Inventors: Lokesh Shivashankara, Bangalore Karnataka (IN); Chinglenkhomba Lamabam, Bangalore Karnataka (IN); Selvaraj Katturaja, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 264 days.

(21) Appl. No.: 16/446,341

(22) Filed: Jun. 19, 2019

(65) Prior Publication Data
US 2020/0403872 A1 Dec. 24, 2020

(51) Int. Cl.
*H04L 41/12* (2022.01)
*H04L 12/46* (2006.01)
*H04L 67/10* (2022.01)
*H04L 67/148* (2022.01)
*G06F 11/20* (2006.01)
*H04L 41/5054* (2022.01)
*G06F 9/48* (2006.01)

(52) U.S. Cl.
CPC .......... *H04L 41/12* (2013.01); *H04L 12/4641* (2013.01); *H04L 67/10* (2013.01); *G06F 9/4856* (2013.01); *G06F 11/2023* (2013.01); *G06F 11/2028* (2013.01); *H04L 41/5054* (2013.01); *H04L 67/148* (2013.01)

(58) Field of Classification Search
CPC ............... H04L 12/4641; H04L 67/148; H04L 67/1031; H04L 41/5054; G06F 9/4856; G06F 9/45533; G06F 11/2023; G06F 11/2028
See application file for complete search history.

(56) References Cited

U.S. PATENT DOCUMENTS

| 10,108,465 | B1 | 10/2018 | Gaudlip | |
| 11,025,483 | B1* | 6/2021 | Hashmi | ............... H04L 63/0272 |
| 11,128,464 | B1* | 9/2021 | Loladia | ................. H04L 63/102 |
| 2009/0055507 | A1* | 2/2009 | Oeda | ..................... G06F 9/4856 |
| | | | | 709/216 |
| 2016/0119417 | A1* | 4/2016 | Fang | .................. H04L 67/1095 |
| | | | | 709/219 |

(Continued)

OTHER PUBLICATIONS

Kubernetes.com, "Migrating Workloads to Different Machine Types", available online at <https://cloud.google.com/kubernetes-engine/docs/tutorials/migrating-node-pool>,Kubernetes Engine Tutorials, accessed on Nov. 30, 2018, 8 pages.

(Continued)

*Primary Examiner* — Tom Y Chang
(74) *Attorney, Agent, or Firm* — Mauriel Kapouytian Woods LLP (57) ABSTRACT

Example techniques for pod migration across nodes of a cluster are described. In an example, in response to receiving a request to migrate a pod from a first region of a cloud computing platform to a second region of the cloud computing platform, the pod may be migrated from a first node in the first region to a second node in the second region. The first node and the second node may each be a part of a cluster of nodes.

20 Claims, 5 Drawing Sheets (56) References Cited

U.S. PATENT DOCUMENTS

| | | | |
|---|---|---|---|
| 2017/0257424 A1* | 9/2017 | Neogi | H04L 43/16 |
| 2017/0257432 A1 | 9/2017 | Fu et al. | |
| 2018/0097701 A1* | 4/2018 | Wu | H04L 43/10 |
| 2018/0152352 A1* | 5/2018 | Kousoulis | H04L 41/12 |
| 2018/0234459 A1 | 8/2018 | Kung et al. | |
| 2018/0314599 A1* | 11/2018 | Aron | G06F 16/27 |
| 2019/0075036 A1* | 3/2019 | Desai | G06F 9/5077 |
| 2019/0230462 A1* | 7/2019 | McLarty | H04L 67/10 |
| 2020/0167189 A1* | 5/2020 | Anand | G06F 9/5038 |
| 2020/0310915 A1* | 10/2020 | Alluboyina | G06F 11/1469 |

OTHER PUBLICATIONS

Loo et al., "Live Pod Migration in Kubernetes", 2018, 9 pages.

Pary., "Run Your Kubernetes Workloads on Amazon EC2 Spot Instances with Amazon EKS", available online at <https://aws.amazon.com/blogs/compute/runyourkubernetesworkloadsonamazonec2spotinstanceswithamazoneks/>, Aug. 30, 2018, 10 pages.

Shachar, "Migrating Pods with Containerized Applications Between Nodes in the Same Kubernetes Cluster Using Cloudify", available online at <https://wp.cloudify.co/2018/01/31/migrating-pods-containerized-applications-nodes-kubernetes-cluster-using-cloudify/, Jan. 31, 2018, 5 pages.

The Kubernetes Authors, "Assigning Pods to Nodes", May 2019, 15 pages, retrieved from internet <https://web.archive.org/web/20190528133424/https://kubernetes.io/docs/concepts/corifiguration/assign-pod-node/>.

* cited by examiner

POD MIGRATION ACROSS NODES OF A CLUSTER

BACKGROUND

Containers may be used to isolate and run workloads, such as applications, in different computing environments. A container may refer to a computing instance that can host a workload and can operate as a separate computer from the point of view of the workload. The container may be part of a pod, which may include one or more containers. A pod may be the smallest functional unit that can be managed independently by a management platform. The pod may be hosted in a node, which may be a computing device or a virtual machine (VM). Several nodes may be managed together as a cluster of nodes. In some instances, a pod may have to be migrated from one node to another in the cluster of nodes.

BRIEF DESCRIPTION OF DRAWINGS

The following detailed description references the figures, wherein.

DETAILED DESCRIPTION

A cloud computing platform may include a plurality of nodes. For instance, a node may be a computing device of the cloud computing platform or may be a VM hosted in a computing device of the cloud computing platform. Groups of nodes may be managed together and may be referred to as a cluster of nodes or a cluster. Each node may host one or more pods and each pod may in turn host one or more containers hosting respective workloads.

The cloud computing platform may have its computing infrastructure, such as computing devices and network devices, distributed over a plurality of regions, each of which may be a separate geographical area. Each region may include several availability zones, which may be isolated locations within the region. Each availability zone, in turn, may include several computing devices.

Generally, all nodes of a cluster may be part of a particular region of the cloud computing platform. For instance, the cluster may be operated by creating and/or managing nodes in a particular region of the cloud computing platform. Accordingly, pods of the cluster are hosted in the particular region. Further, the pods may be migrated across nodes of the cluster, which are in the same region. In some cases, a pod of the cluster may have to be migrated to another region of the cloud computing platform, for example, due to lack of resources in the region, an impending failure or shutdown of the region, and proximity of the other region to a user of a workload hosted in a container of the pod. However, generally, the pods of the cluster cannot be migrated from one region to another.

The present subject matter relates to pod migration across nodes of a cluster. With the implementations of the present subject matter, pods can be migrated across regions of a cloud computing platform.

In accordance with an example implementation, a request is received to migrate a pod deployed in a first region of a cloud computing platform to a second region of the cloud computing platform. For example, the pod may be deployed in a first node in the first region, where the first node is a part of a cluster of nodes, also referred to as a cluster. The first region and the second region may be present in different geographical locations. The request may be made by a user of a workload hosted in a container that is part of the pod. The workload hosted in the container of the pod may be referred to as the workload hosted by the pod. The request may be received by a computing device in the first region.

In response to the request, the computing device may instruct a cluster manager of the cluster to migrate the pod to a second node that is in the second region and that is a part of the cluster. In an example, the computing device provisions the second node in the second region in response to the request to migrate the pod to the second region. For instance, upon receiving the request, the computing device provisions the second node in the second region as a part of the cluster, and thereafter, migrates the pod to the second node. In another example, the computing device may provision the second node in response to a separate request to provision a node as a part of the cluster in the second region. Subsequently, upon receiving the request to migrate the pod to the second region, the computing device may migrate the pod to the second node.

The present subject matter enables migration of the pods across regions of a cloud computing platform. For instance, the provisioning of a new node as a part of the cluster in a new region and subsequent migration of pods to the newly provisioned node ensures that pods can be migrated across the regions. Therefore, the present subject matter can ensure that user requests to workloads are handled even if a region of the cloud computing platform fails, shuts down, or lacks resources, as at least some of the pods of the cluster can be made active from the new region. Therefore, the present subject matter can improve reliability and performance of workloads. Further, using the present subject matter, pods can be provisioned in a region nearer to a user of a workload hosted in the pod. Therefore, latency in handling the user requests can be reduced.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Figure 1:
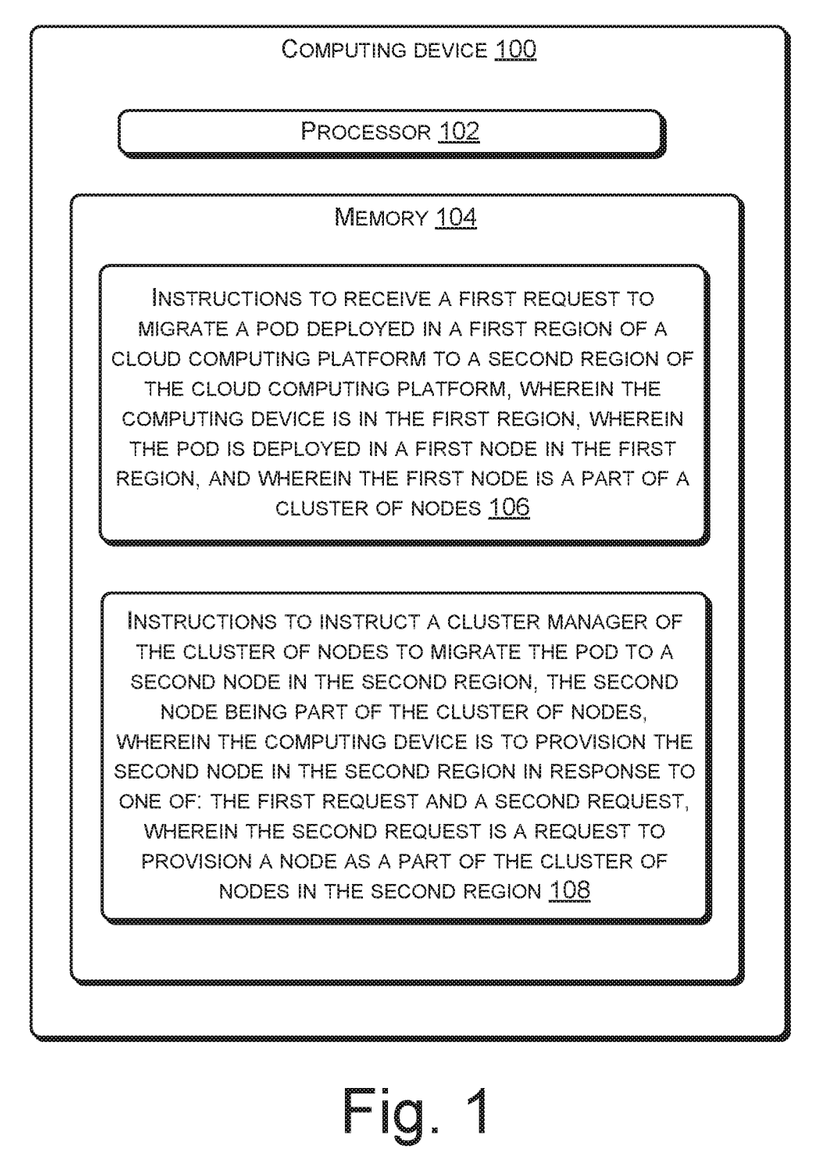
FIG. 1 illustrates a computing device for pod migration across computing nodes of a cluster of computing nodes, according to an example implementation of the present subject matter.

FIG. 1 illustrates a computing device 100 for pod migration across computing nodes of a cluster of computing nodes, according to an example implementation of the present subject matter. The computing device 100 may be, for example, a desktop computer, a laptop computer, a server, and the like. The computing device 100 includes a processor 102 and a memory 104 coupled to the processor 102. In an example, the computing device 100 may belong to a cloud computing platform. Further, the computing device 100 may be part of a first region of the cloud computing platform.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the memory 104. The computer-readable instructions, hereinafter referred to as instructions, include instructions 106 and instructions 108. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the computing device 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the computing device 100 can facilitate migration of pods across computing nodes of a cluster of computing nodes. A computing node, also referred to as a node, may be a computing device or a virtual machine (VM) hosted in a computing device. A cluster of nodes, interchangeably referred to as a cluster, may refer to nodes which have their resources, such as storage, processor, and memory, managed together. Further, a pod may refer to a smallest unit that can be managed independently by a platform that manages the cluster. The pod may include one or more containers, each of which can host a workload.

In an example, the computing device 100 may receive a request to migrate the pod deployed in the first region of the cloud computing platform to a second region of the cloud computing platform. The pod may be hosted in a first node that is present in the first region. For instance, the first node may be a computing device in the first region or a VM hosted in a computing device in the first region. The first node may be a part of a cluster of nodes. The request to migrate the pod from the first region to the second region may be referred to as a first request. The computing device 100 may receive the first request by executing the instructions 106.

In response to the first request, the computing device 100 can instruct a cluster manager (not shown in FIG. 1) of the cluster to migrate the pod to a second node in a second region of the cloud computing platform. The cluster manager may be implemented as a module that is coupled to and/or executable by the processor 102. The computing device 100 can instruct the cluster manager by executing the instructions 108.

In an example, the computing device 100 can provision the second node in the second region in response to the first request. In another example, the computing device 100 can provision the second node in response to a request to provision a node in the second region as a part of the cluster. The request to provision a node in the second region as a part of the cluster may be referred to as a second request.

Once the second node is provisioned in the second region, the computing device 100 may enable migration of the pod to the second region. The migration of pods across regions of a cloud computing platform will be explained in greater detail below.

Figure 2:
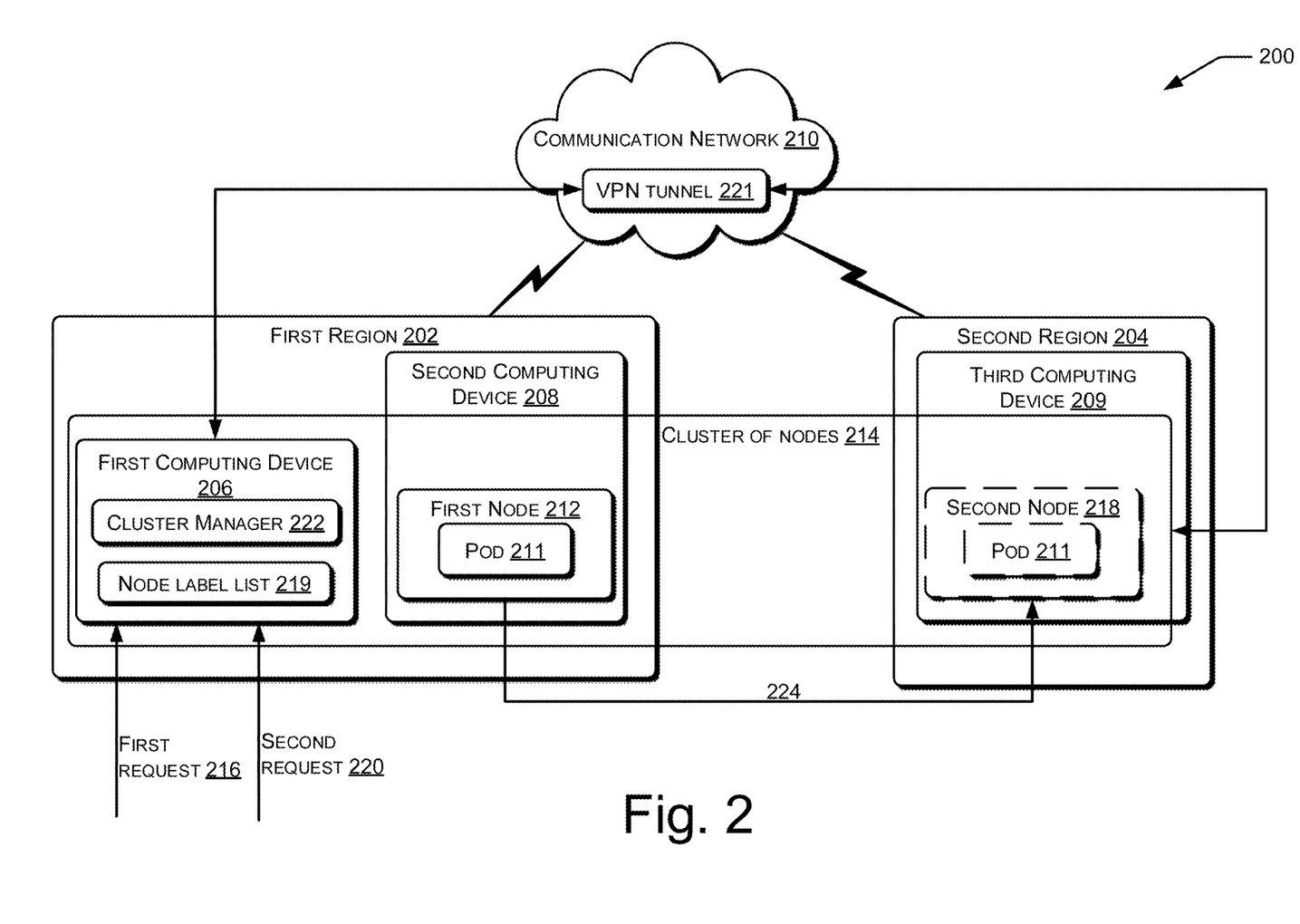
FIG. 2 illustrates a computing environment of a cloud computing platform, according to an example implementation of the present subject matter.

FIG. 2 illustrates a computing environment 200 of a cloud computing platform, according to an example implementation of the present subject matter. A cloud computing platform may refer to a platform that offers computer system resources, such as computing power and storage, to users without direct and active management by the users. Examples of cloud computing platform are Amazon Web Services™ and Microsoft® Azure®.

An Information technology (IT) infrastructure of a cloud computing platform may be distributed over a plurality of geographical locations to provide for fault tolerance and stability. A portion of the IT infrastructure of the cloud computing platform in a geographical location may be referred to as a region. In an example, a region of the cloud computing platform may be a data center. Further, in an example, the regions of the cloud computing platform may be part of a public cloud of the cloud computing platform. The regions of the cloud computing platform may include, for example, a first region 202 and a second region 204. Each region may include a plurality of computing devices. For instance, the first region 202 includes a first computing device 206 and a second computing device 208 and the second region 204 includes a third computing device 209 and a plurality of other computing devices (not shown in FIG. 2 for the sake of clarity).

The regions of the cloud computing platform may be connected to each other through a communication network 210. The communication network 210 may be a wireless or a wired network, or a combination thereof. The communication network 210 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 210 includes various network entities, such as transceivers, gateways, and routers.

In an example, the computing devices in a region may be distributed among a plurality of availability zones. For instance, the first computing device 206 and a fourth computing device (not shown in FIG. 2) may be part of a first availability zone (not shown in FIG. 2) in the first region 202, while the second computing device 208 and a fifth computing device (not shown in FIG. 2) may be part of a second availability zone in the first region 202. An availability zone may be isolated from and independent of other availability zones of the region and may be connected to the other availability zones through low-latency links.

In some cases, the computing devices of the cloud computing platform may host workloads. A workload may refer to a set of machine-readable instructions that can be executed by a processor, such as the processor 102, to perform a task. The task may be performed, for example, in response to a user request to provide a response to the user.

Accordingly, the workload may be said to handle user requests. Examples of workload are a web application and a database.

A workload may be hosted in a container (not shown in FIG. 2), which is a computing instance that can host a workload and can operate as a separate computer from the point of view of the workload. For instance, the container can isolate the workload running within itself from a computing device the container is hosted in and from other containers hosted in the computing device. The container may provide, among other things, application code, runtime, system tools, system libraries, and settings to the workload. Further, the container can provide a consistent runtime environment to the workload regardless of the computing device it is hosted in.

In an example, one or more containers may be part of a pod, such as a pod 211. A pod may be the smallest functional unit that can be independently managed, such as created and deleted. A pod may have containers having workloads that perform similar functions. Since a container is part of a pod, a workload hosted in the container may be referred to as being hosted in the pod.

A pod may be hosted in a computing node in a region of the cloud computing platform. The computing node may be referred to as a node and may be, for example, a computing device or a virtual machine (VM) hosted in a computing device. Example of a node is a first node 212, which hosts the pod 211 and is hosted in the second computing device 208.

In an example, several nodes may be managed together. For instance, the resources, such as processor resources, memory resources, and storage resources, of several nodes may be managed as if they belonged to a single computing node. Such nodes, that are managed together, may be referred to as a cluster of nodes or a cluster. Example of the cluster is a cluster 214, which includes the first node 212 and a third node (not shown in FIG. 2) in a fourth computing device. The cluster 214 may be managed by a cluster management platform, such as Kubernetes™.

Generally, all nodes of a cluster are present in a single region of the cloud computing platform. For instance, all nodes of the cluster 214 may be part of a first availability zone in the first region 202. Therefore, it may not be possible to migrate a pod, such as the pod 211, from one region, such as the first region 202, to another region, such as the second region 204. The present subject matter facilitates migration of a pod from one region to another.

The migration of the pod from the first region 202 to the second region 204 may be facilitated by a computing device in the first region 202. Such a computing device may be the first computing device 206, which may be, for example, an implementation of the computing device 100. In an example, the first computing device 206 may be a master node of the cluster 214 and may be part of the cluster 214, as illustrated in FIG. 2. In another example, the first computing device 206 may host a master node of the cluster 214. A master node of a cluster may perform a plurality of functions for managing the cluster. Example functions performed by the master node are scheduling pods to nodes in the cluster and validating and configuring data for the pods. The nodes of the cluster other than the master node may be used to host pods and may be referred to as worker nodes. Accordingly, the first node 212 may be a worker node of the cluster 214.

In an example, the migration of the pod 211 from the first region 202 to the second region 204 may be initiated in response to the first computing device 206 receiving a request for the migration. In another example, the migration of the pod 211 from the first region 202 to the second region 204 may be initiated in response to the master receiving the request for the migration. The request may be referred to as a first request 216. The first request 216 may be sent by a user of the workload hosted in the pod 211. The user may send the first request, for example, because the user is located nearer to the second region 204 compared to the first region 202. Accordingly, the migration of the pod 211 may reduce latency in the communication between the user and the workload.

Since the pod 211 is a part of the cluster 214, the pod 211 is to be migrated across nodes of the cluster 214. Accordingly, in response to receiving the first request 216 to move the pod 211 to the second region 204, the first computing device 206 may determine whether the second region 204 has a node that is a part of the cluster 214. If the first computing device 206 determines that the second region 204 does not have a node that is a part of the cluster 214, the first computing device 206 may provision a second node 218 in the third computing device 209 in the second region 204 as a part of the cluster 214. The provisioning of the second node 218 may refer to creation of the worker node 218. It may be noted that the first computing device 206 provisions a node in a region remotely located from the region in which it is deployed. In FIG. 2, the second node 218 is shown in dotted lines to depict the provisioning of the second node 218.

If the first computing device 206 determines that a node is already present in the second region 204 as a part of the cluster 214, the first computing device 206 may select the already-present node for hosting the pod 211. The already-present node may be the second node 218. The first computing device 206 may select the second node 218 if the second node 218 has sufficient resources to host the pod 211. If the second node 218 does not have sufficient resources to host the pod 211, the first computing device 206 may determine that a new node is to be provisioned in the second region 204 as a part of the cluster 214.

In an example, to determine whether the second node 218 is already provisioned in the second region 204 as a part of the cluster 214 and to facilitate the selection of the node to host the pod 211, the first computing device 206 may utilize a list 219 corresponding to the cluster 214. The list 219 may specify nodes belonging to the cluster 214 and the region in which each node is deployed. Accordingly, if the second node 218 is already provisioned in the second region 204, the list 219 may specify the second node 218 and that the second node 218 is in the second region 204. The list may specify labels of nodes ("node labels") that is a part of the cluster 214, and may be referred to as a node label list 219. In an example, the node label list 219 may be stored in the first computing device 206. Such a list may be a part of a distributed key value store. The node label list 219 may be updated as and when a new node is provisioned as a part of the cluster 214.

In an example, the second node 218 may have been already provisioned in the second region 204 by the first computing device 206 in response to a request for provisioning a node in the second region 204 as a part of the cluster 214. Such a request may be received by the first computing device 206 and may be referred to as a second request 220. The second request 220 may be sent by a user, for example, to enable migration of the pod 211 or another pod in the first region 202 to the second region 204.

The provisioning of the second node 218 in the second region 204 by the first computing device 206, whether in response to the first request 216 or the second request 220, enables the cluster 214 to scale up from the first region 202 to the second region 204. The scaling up of the cluster 214 is depicted by the block 214 including nodes from both the first region 202 and the second region 204.

In an example, upon provisioning the second node 218 in the second region 204, the first computing device 206 may establish a virtual private network (VPN) tunnel 221 for communication with the second node 218. Subsequently, the first computing device 206 may communicate with the second node 218 through the VPN tunnel 221. A VPN may refer to an extension of a private network across a public network, such as the communication network 210. Further, a VPN tunnel may refer to an encrypted communication pathway between two computing nodes. The VPN tunnel 221 may be established, for example, between the first computing device 206 and the third computing device 209, which hosts the second node 218. The establishment of the VPN tunnel 221 ensures that the master node of the cluster 214 can communicate with worker nodes outside of the region in which the master node is deployed.

Upon provisioning of the second node 218 in response to the first request 216 or upon selecting the second node 218 in response to the second request 220, the first computing device 206 may instruct a cluster manager 222 to migrate the pod 211 from the first node 212 to the second node 218. In an example, the cluster manager 222 may be provided in the first computing device 206. In another example, the cluster manager 222 may be provided in a node of the cluster other than the master node, such as the first node 212.

The cluster manager 222 may be implemented as a module that is coupled to and/or executable by the processor 102, and may include, among other things, routines, programs, objects, components, data structures, and the like, which perform particular tasks or implement particular abstract data types. If the cluster manager 222 is a part of the first computing device 206, the instruction by the first computing device 206 to the cluster manager 222 may be, for example, an instruction from another module (not shown in FIG. 2) of the first computing device 206.

In response to receiving the instruction to migrate the pod 211 to the second node 218, the cluster manager 222 may migrate the pod 211 to the second node 218. The migration of the pod 211 is illustrated by an arrow 224. In an example, the migration of the pod 211 may involve deleting a first instance of the pod 211 in the first node 212 and creating a new instance of the pod 211 in the second node 218. The creation of the new instance of the pod 211 is depicted by showing the pod 211 in the second node 218 in dotted lines.

In an example, the migration of the pod 211 from the first node 212 to the second node 218 may be facilitated by changing a node selector label of the pod 211.

Figure 3:
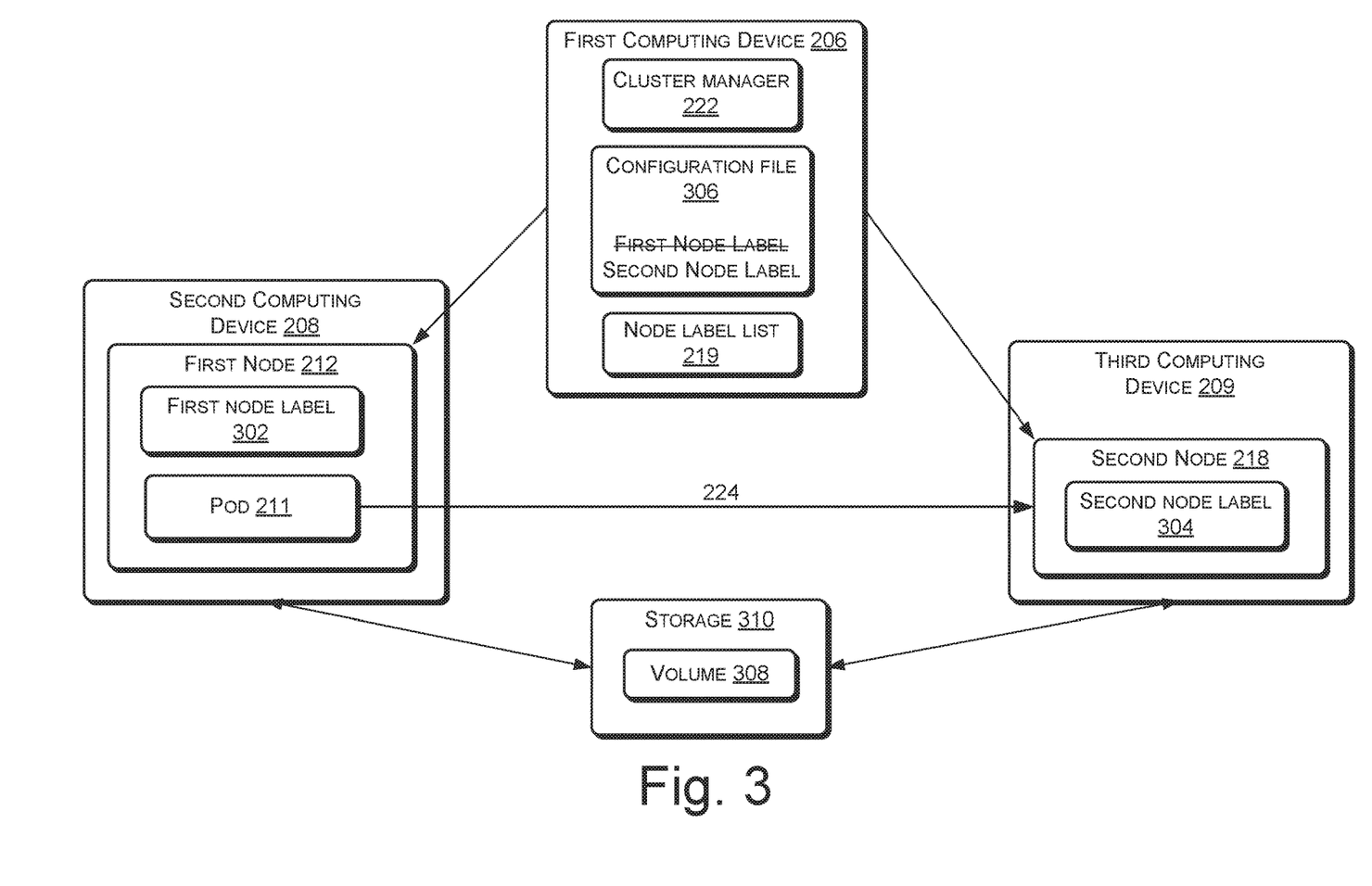
FIG. 3 illustrates migration of a pod between nodes in different regions of a cloud computing platform, according to an example implementation of the present subject matter.

FIG. 3 illustrates migration of the pod 211 between nodes in different regions of the cloud computing platform, according to an example implementation of the present subject matter. To facilitate specifying the node that is to host a pod, each node may have a label attached to it. The label attached to a node may be referred to a node label. The node label corresponding to the first node 212 may be referred to as a first node label 302 and the node label corresponding to the second node 218 may be referred to as a second node label 304. A label may be a key-value pair, with the key specifying the parameter that the label corresponds to and the value specifying the value of the parameter. For instance, the parameter of the first node label 302 may be "node-name" and the value may be, for example, "first-node". Similarly, the parameter of the second node label 304 may be "node-name" and the value may be, for example, "second-node".

The node label may be attached to a node by the first computing device 206 upon provisioning of the node. For instance, after provisioning the second node 218 in response to the first request 216 or the second request 220, the first computing device 206 may attach the second node label 304 to the second node 218.

In addition to attaching the node label to each node, the first computing device 206 may also specify node label of a node that is to host the pod in a configuration file corresponding to the pod. The configuration file may be, for example, in a YAML (Yet Another Markup Language) format. The configuration file may be stored, for example, in the first computing device 206. The first computing device 206 may specify the node label in the configuration file of a pod at the time of creation of the pod. For instance, the first computing device 206 may specify the first node label 302 in a configuration file 306 of pod 211 at the time of creation of the pod 211 to indicate that the pod 211 is to be hosted in the first node 212. Subsequently, when the pod 211 is to be migrated to the second node 218, the first computing device 206 may update the configuration file 306 by replacing the first node label 302 with the second node label 304, as illustrated in FIG. 3. The update of the node label in the configuration file 306 causes the cluster manager 222 to migrate the pod 211 from the first node 212 to the second node 218. Accordingly, the update of the node label may act as an instruction to the cluster manager 222 to migrate the pod 211.

In an example, the change of the node label in the configuration file 306 may be performed by the first computing device 206. For instance, the first computing device 206 may change the node label after receiving the first request 216 and after provisioning the second node 218 in the second region 204. If the second node 218 was provisioned before receiving the first request 216, for example, in response to the second request 220, the first computing device 206 may select the second node 218 for hosting the pod 211. In an example, the first computing device 206 may determine that the second node 218 is present in the second region 204 and is a part of the cluster 214 based on the node label list 219. For instance, as explained earlier, the node label list 219 may specify node labels of each node in the cluster 214 and also the region in which each node in the cluster 214 is deployed. Accordingly, upon receiving the first request, the first computing device 206 may check the node label list 219 to determine whether the cluster 214 has a node in the second region 204. If available, the first computing device 206 may select the second node 218. Such a selection may be performed based on, for example, available resources of the second node 218. Upon selecting the second node 218, the first computing device 206 may change the node label of the configuration file 306 by replacing the first node label 302 with the second node label 304.

In another example, the change of the node label may be performed by the user. For instance, after provisioning the second node 218 in response to the second request 220 and after attaching the second node label 304 to the second node 218, the first computing device 206 may provide the second node label 304 to the user. Thereafter, the user may indicate that the pod 211 is to be migrated to the second node 218 by changing the node label in the configuration file 306. In accordance with this example, the first request 216 may be the change of the node label in the configuration file 306. Upon the change of the node label, the first computing device 206 may ascertain whether the node specified by the changed node label, i.e., the second node 218 is present in the second region 204 and is a part of the cluster 214. For the ascertaining, the first computing device 206 may utilize the node label list 219. If, based on the node label list 219, the first computing device 206 determines that the node corresponding to the changed node label is present in the second region 204 and is a part of the cluster 214, the cluster manager 222 may be notified of the change of the node label. Such a notification acts as the instruction to the cluster manager 222 for migrating the pod 211. Accordingly, upon receiving the notification, the cluster manager 222 may perform the migration of the pod 211.

In an example, the pod 211 may be one of a plurality of pods of a service, such as an Elastic Load Balancer (ELB) service. In such a case, the first request 216 may be a request to migrate the service to the second region 204. Accordingly, upon receiving the first request 216, the first computing device 206 may cause migration of all pods of the service to the second region 204. In an example, the pods of the service may be migrated one after another. For instance, after a first pod of the service is migrated to the second region 204, the migration of a second pod may be commenced. Therefore, user requests to the service can be handled by the second pod when the first pod is migrated and by the first pod when the second pod is migrated. Thus, the downtime of the service can be significantly reduced.

As mentioned earlier, the migration of the pod 211 may involve deleting a first instance of the pod 211 in the first node 212 and creating a new instance of the pod 211 in the second node 218. In such a case, to ensure that data corresponding to the pod 211 is not deleted with the deletion of the first instance of the pod 211, in an example, the data corresponding to the pod 211 may be stored in a volume 308 that is outside of the pod 211. The volume 308 may be part of a storage 310, which may be, for example, a hardware disk array. In an example, the storage 310 may belong to a VM in the cluster 214. The storage 310 may be accessible by both the second computing device 208 and the third computing device 209. Therefore, even after instantiation of the new instance of the pod 211, the data corresponding to the pod 211 can be accessed.

Figure 4:
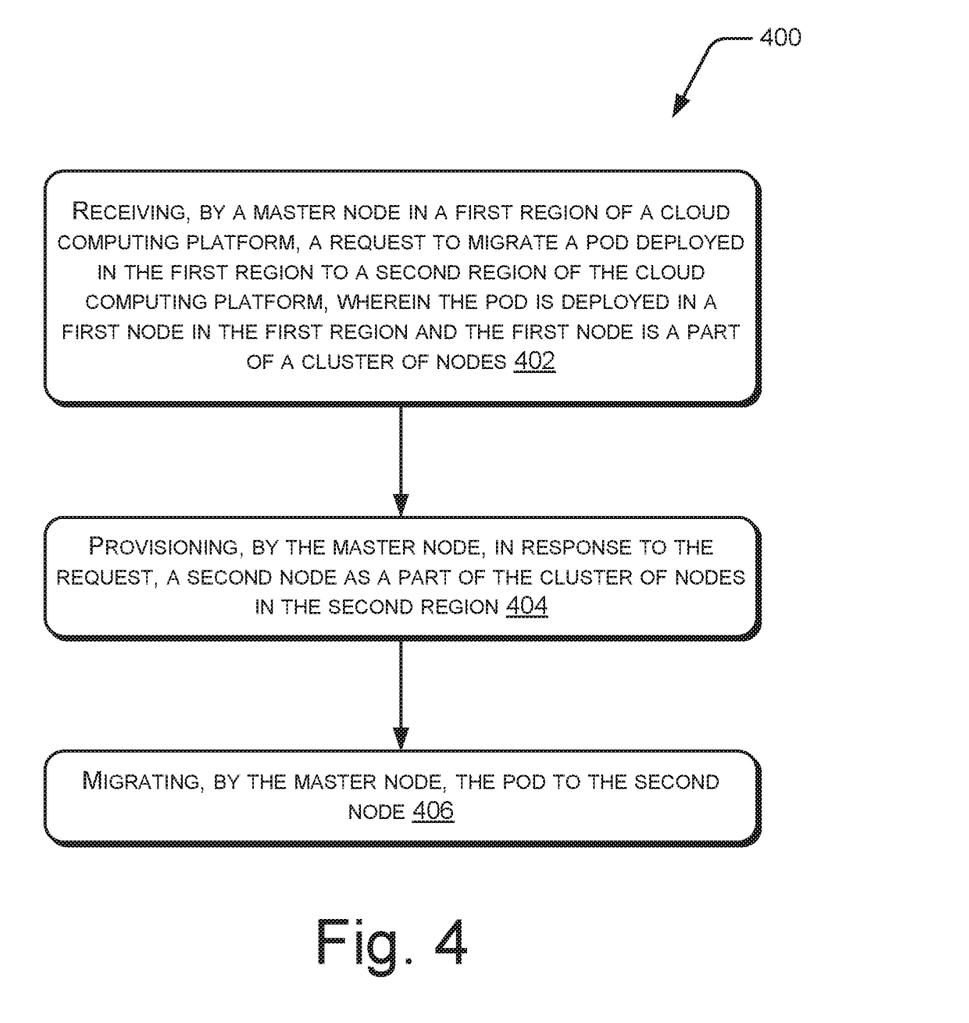
FIG. 4 illustrates a method for pod migration across nodes of a cluster, according to an example implementation of the present subject matter.

FIG. 4 illustrates a method 400 for pod migration across nodes of a cluster, according to an example implementation of the present subject matter.

The order in which the method 400 is described is not intended to be construed as a limitation, and any number of the described method blocks may be combined in any order to implement the method 400, or an alternative method. Furthermore, the method 400 may be implemented by processing resource(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the method 400 may be implemented in a variety of systems, the method 400 is described in relation to the computing device 100, for ease of explanation. In an example, the method 400 may be performed by a processing resource, such as the processor 102.

At block 402, a master node in a first region of a cloud computing platform may receive a request to migrate a pod deployed in the first region to a second region of the cloud computing platform. The pod may be deployed in a first node in the first region and the first node is a part of a cluster of nodes. In an example, the master node may be the computing device 100 or a VM hosted in the computing device 100. Further, the first region may be the first region 202, the second region may be the second region 204, the pod may be the pod 211, and the cluster of nodes may be the cluster 214.

In an example, the request to migrate the pod may be a request to migrate a service including the pod from the first region to the second region. Accordingly, the method 400 may include migrate each pod of the service from the first region to the second region.

At block 404, in response to the request, the master node may provision a second node as a part of the cluster of nodes in the second region. The second node may be, for example, the second node 218. Further, at block 406, the master node may migrate the pod to the second node. The migration of the pod may involve deleting an instance of the pod in the first node and creating a new instance of the pod in the second node.

In an example, the migration of the pod to the second node includes configuring a second node label for the second node and changing a node label in a configuration file for the pod from a first node label to the second node label. Here, the first node label corresponds to the first node and the node label in the configuration file for the pod is indicative of the node that is to host the pod. The changing of the node label may be performed by a module in the master node. Further, a notification of the change of the node label may be received by a second module, which may treat the change of the node label as an instruction to migrate the pod to the node. The second module may be, for example, the cluster manager 222. Further, the first node label may be, for example, the first node label 302 and the second node label may be, for example, the second node label 304.

Figure 5:
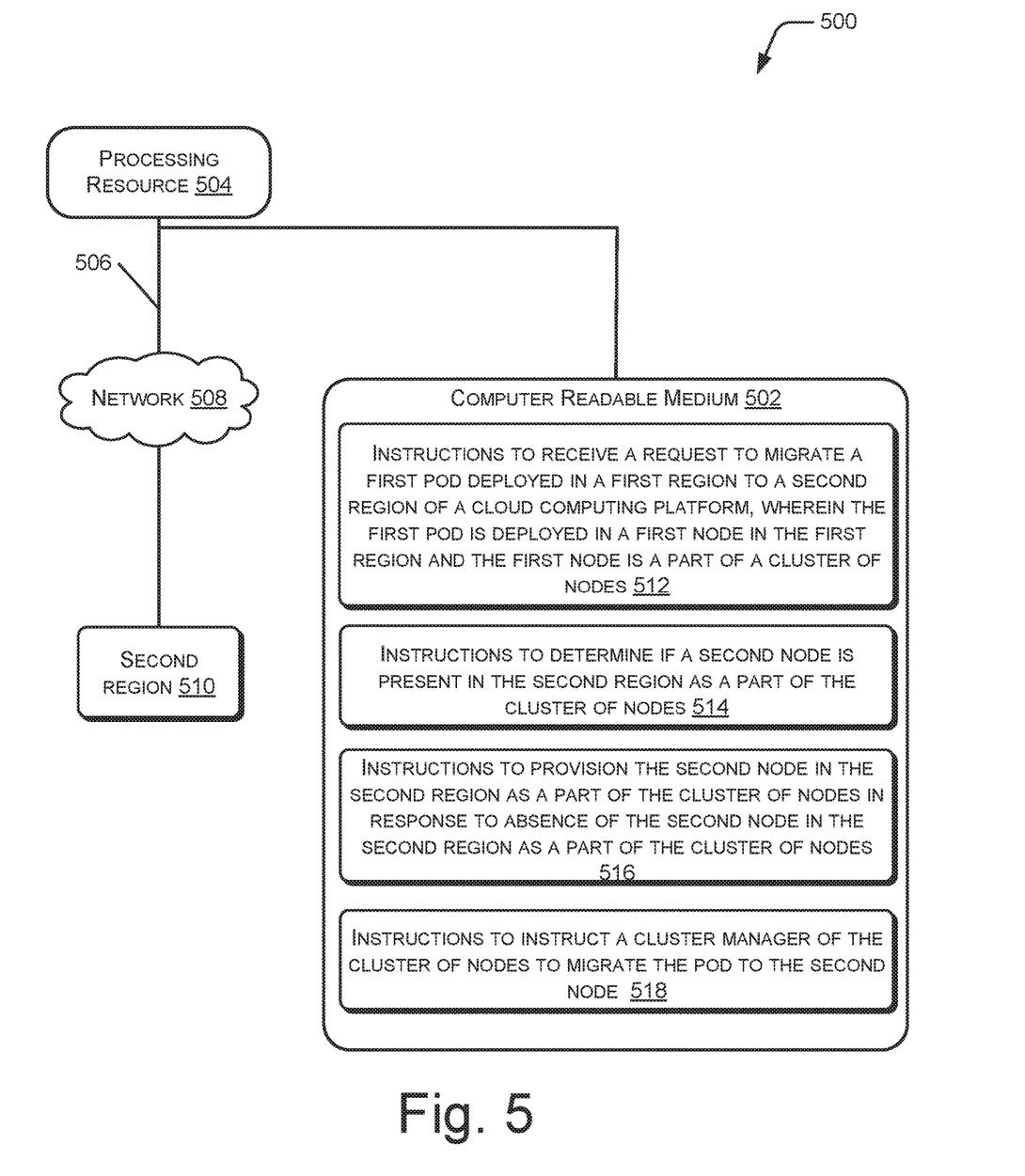
FIG. 5 illustrates a computing environment implementing a non-transitory computer-readable medium for pod migration across nodes of a cluster, according to an example implementation of the present subject matter.

FIG. 5 illustrates a computing environment 500 implementing a non-transitory computer-readable medium 502 for pod migration across nodes of a cluster, according to an example implementation of the present subject matter.

In an example, the non-transitory computer-readable medium 502 may be utilized by a computing device, such as the computing device 100. In an example, the computing device may be part of a first region of a cloud computing platform, such as the first region 202. Further, the computing device may be implemented in a public networking environment or a private networking environment. In an example, the computing environment 500 may include a processing resource 504 communicatively coupled to the non-transitory computer-readable medium 502 through a communication link 506.

In an example, the processing resource 504 may be implemented in a system, such as the computing device 100. The processing resource 504 may be the processor 102. The non-transitory computer-readable medium 502 may be, for example, an internal memory device or an external memory device. In one implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to a second region 510 of the cloud computing platform over the network 508. The second region 510 may be, for example, the second region 204.

In an example implementation, the non-transitory computer-readable medium 502 includes a set of computer-readable instructions to facilitate pod migration across nodes of a cluster of nodes. The set of computer-readable instructions can be accessed by the processing resource 504 through the communication link 506 and subsequently executed.

Referring to FIG. 5, in an example, the non-transitory computer-readable medium 502 includes instructions 512 that cause the processing resource 504 to receive a request to migrate a first pod deployed in the first region to the second region of the cloud computing platform. The first pod may be deployed in a first node in the first region and the first node is a part of a cluster of nodes. The first pod may be, for example, the pod 211. The cluster of nodes may be referred to as a cluster and may be, for example, the cluster 214.

The non-transitory computer-readable medium 502 includes instructions 514 that cause the processing resource 504 to determine if a node is present in the second region as a part of the cluster. A node that is present or that is to be present in the second region as a part of the cluster may be referred to as a second node. In an example, to determine if the cluster has a second node that is deployed in the second region, a node label list corresponding to the cluster, such as the node label list 219, may be utilized. The node label list may specify a node label for each node of the cluster of nodes and a region in which each node of the cluster of nodes is deployed.

If it is determined that the second node is absent in the second region as a part of the cluster, instructions 516 of the non-transitory computer-readable medium 502 cause the processing resource 504 to provision the second node in the second region as a part of the cluster of nodes. Further, instructions 518 of the non-transitory computer-readable medium 502 cause the processing resource 504 to instruct a cluster manager to migrate the first pod to the second node. The cluster manager may be, for example, the cluster manager 222.

After provisioning the second node in the second region, the second node may be used to host other pods of the cluster as well. For instance, if a request is received to migrate a second pod deployed in the first region to the second region, the instructions 518 may instruct the cluster manager to migrate the second pod to the second node.

If, upon execution of the instructions 514, it is determined that the second node is present in the second region as a part of the cluster, the instructions 518 of the non-transitory computer-readable medium 502 cause the processing resource 504 to instruct the cluster manager to migrate the first pod to the second node. In some cases, the non-transitory computer-readable medium 502 includes a second set of instructions that are executable to implement the cluster manager, which can migrate the second pod to the second node. Accordingly, by executing the second set of instructions, the first pod may be migrated to the second node.

In an example, to instruct the cluster manager to migrate the first pod to the second node, the non-transitory computer-readable medium 502 includes instructions that are executable to change a node label in a configuration file for the first pod from a first node label to a second node label, where the first node label corresponds to the first node and the second node label corresponding to the second node. The first node label may be the first node label 302 and the second node label may be the second node label 304. Further, to enable using the node labels for the migration, the non-transitory computer-readable medium 502 comprises instructions that are executable to configure the first node label to the first node after the first node is provisioned and configure the second node label to the second node after the second node is provisioned.

In an example, the request may be a change in a node label in a configuration file for the first pod from a first node label to a second node label. The configuration file may be, for example, the configuration file 306. For instance, a user of the first pod may replace the node label in the configuration file for the first pod if he is aware that the second region has the second node as a part of the cluster and if he is aware of the second node label. In such a case, upon receiving the request, it may be ensured that a second node does exist in the second region as a part of the cluster. For the ensuring, the node label list may be utilized. For instance, if node label list specifies the second node label and specifies the region of the second node as the second region, it may be ensured that the second node is present in the second region and is a part of the cluster of nodes.

The present subject matter enables migration of the pods across regions of a cloud computing platform. For instance, the provisioning of a new node as a part of the cluster in a new region and subsequent migration of pods to the newly provisioned node ensures that pods can be migrated across the regions. Therefore, the present subject matter can ensure that user requests to workloads are handled even if a region of the cloud computing platform fails, shuts down, or lacks resources, as at least some of the pods of the cluster can be made active from the new region. Therefore, the present subject matter can improve reliability and performance of workloads. Further, using the present subject matter, pods can be provisioned in a region nearer to a user of a workload hosted in the pod. Therefore, latency in handling the user requests can be reduced.

Although implementations of updating of pod migration across nodes of a cluster have been described in language specific to structural features and/or methods, it is to be understood that the present subject matter is not necessarily limited to the specific features or methods described. Rather, the specific features and methods are disclosed and explained as example implementations.

We claim:

1. A method comprising:

maintaining, by a master node of a cluster of a plurality of nodes, a node label list corresponding to the cluster, wherein the master node is in a first region of a plurality of regions of a cloud computing platform, and wherein the node label list identifies the plurality of nodes belonging to the cluster by respective node labels associated with the plurality of nodes and identifies, for each node of the plurality of nodes, a region of the plurality of regions in which the node is deployed, and wherein the cluster may span multiple of the plurality of regions;

receiving, by the master node, a request to migrate a pod deployed in the first region to a second region of the plurality of regions, wherein the pod is deployed in a first worker node in the first region and the first worker node is a part of the cluster;

responsive to the request, determining, by the master node, whether a second worker node that is part of the cluster is present in the second region based on the node label list;

upon determining that the second worker node is absent in the second region based on the node label list maintained by the master node, provisioning, by the master node, the second worker node as a part of the cluster in the second region; and migrating, by the master node, the pod to the second worker node.

2. The method of claim 1, wherein migrating the pod to the second worker node comprises:

configuring a second node label for the second worker node; and changing a node selector label in a configuration file for the pod from a first node label to the second node label, wherein the first node label corresponds to the first worker node and wherein the node selector label is indicative of a particular node of the plurality of nodes that is to host the pod.

3. The method of claim 2, wherein migrating the pod to the second worker node further comprises:

deleting an instance of the pod in the first worker node; and creating a new instance of the pod in the second worker node.

4. The method of claim 1, wherein the request is a request to migrate a service comprising the pod from the first region to the second region.

5. A computing device comprising:

a processor; and a memory having stored therein that when executed by the processor cause the computing device to:

maintain a node label list corresponding to a cluster of a plurality of nodes, wherein the node label list identifies the plurality of nodes belonging to the cluster by respective node labels associated with the plurality of nodes and identifies, for each node of the plurality of nodes, a region of the plurality of regions in which the node is deployed, and wherein the cluster may span multiple of the plurality of regions;

receive a request to migrate a pod deployed in a first region of a plurality of regions of a cloud computing platform to a second region of the plurality of regions, wherein the pod is deployed in a first worker node in the first region and the first worker node is a part of the cluster;

responsive to the request, determine, whether a second worker node that is part of the cluster is present in the second region based on the node label list;

upon determining that the second worker node is absent in the second region based on the node label list maintained by the master node, provision the second worker node as a part of the cluster in the second region; and migrate the pod to the second worker node.

6. The computing device of claim 5, wherein migration of the pod to the second worker node comprises:

configuring a second node label for the second worker node; and changing a node selector label in a configuration file for the pod from a first node label to the second node label, wherein the first node label corresponds to the first worker node and wherein the node selector label is indicative of a particular node of the plurality of nodes that is to host the pod.

7. The computing device of claim 6, wherein migration of the pod to the second worker node further comprises:

deleting an instance of the pod in the first worker node; and creating a new instance of the pod in the second worker node.

8. The computing device of claim 5, wherein the request is a request to migrate a service comprising the pod from the first region to the second region.

9. The computing device of claim 8, wherein the service comprises an Elastic Load Balancer (ELB) service.

10. The computing device of claim 5, wherein the node label list is part of a distributed key-value store.

11. The computing device of claim 5, wherein the cluster is managed by a cluster management platform.

12. The computing device of claim 11, wherein the cluster management platform comprises Kubernetes.

13. A non-transitory computer-readable medium having stored therein instructions that when executed by a processing resource of a computing device in a first region of a plurality of regions of a cloud computing platform cause the computing device to:

maintain a node label list corresponding to a cluster of a plurality of nodes, wherein the node label list identifies the plurality of nodes belonging to the cluster by respective node labels associated with the plurality of nodes and identifies, for each node of the plurality of nodes, a region of the plurality of regions in which the node is deployed, and wherein the cluster may span multiple of the plurality of regions;

receive a request to migrate a pod deployed in the first region to a second region of the plurality of regions, wherein the pod is deployed in a first worker node in the first region and the first worker node is a part of the cluster;

responsive to the request, determine, whether a second worker node that is part of the cluster is present in the second region based on the node label list;

upon determining that the second worker node is absent in the second region based on the node label list maintained by the master node, provision the second worker node as a part of the cluster in the second region; and migrate the pod to the second worker node.

14. The non-transitory computer-readable medium of claim 13, wherein migration of the pod to the second worker node comprises:

configuring a second node label for the second worker node; and changing a node selector label in a configuration file for the pod from a first node label to the second node label, wherein the first node label corresponds to the first worker node and wherein the node selector label is indicative of a particular node of the plurality of nodes that is to host the pod.

15. The non-transitory computer-readable medium of claim 14, wherein migration of the pod to the second worker node further comprises:

deleting an instance of the pod in the first worker node; and creating a new instance of the pod in the second worker node.

16. The non-transitory computer-readable medium of claim 13, wherein the request is a request to migrate a service comprising the pod from the first region to the second region.

17. The non-transitory computer-readable medium of claim 16, wherein the service comprises an Elastic Load Balancer (ELB) service.

18. The non-transitory computer-readable medium of claim 13, wherein the instructions further cause the computing device to establish a virtual private network (VPN) tunnel for communication with the second worker node.

19. The non-transitory computer-readable medium of claim 13, wherein the cluster is managed by a cluster management platform.

20. The non-transitory computer-readable medium of claim 19, wherein the cluster management platform comprises Kubernetes.

\* \* \* \* \*